United States Patent [19]

Sakano et al.

[11] 4,317,891
[45] Mar. 2, 1982

[54] THERMOPLASTIC COMPOSITION CONTAINING POLYCARBONATE, POLYAMIDE AND RUBBERY GRAFT COPOLYMER

[75] Inventors: Hajime Sakano, Hirakata; Akitoshi Ito, Yao; Miyuki Terada, Amagasaki, all of Japan

[73] Assignee: Sumitomo Naugatuck Co., Ltd., Osaka, Japan

[21] Appl. No.: 171,613

[22] Filed: Jul. 23, 1980

[30] Foreign Application Priority Data

Jul. 24, 1979 [JP] Japan .................................. 54/94785
Jul. 24, 1979 [JP] Japan .................................. 54/94786

[51] Int. Cl.$^3$ ...................... C08L 51/04; C08L 69/00; C08L 77/00
[52] U.S. Cl. ........................................ 525/66; 525/146
[58] Field of Search .................................. 525/66, 146

[56] References Cited

U.S. PATENT DOCUMENTS

| | | | |
|---|---|---|---|
| 3,431,224 | 3/1969 | Goldblum | 525/146 |
| 3,978,158 | 8/1976 | Yonemitsu | 525/146 |
| 4,141,863 | 2/1979 | Coran | 525/146 |
| 4,146,587 | 3/1979 | Beck | 525/146 |
| 4,196,276 | 4/1980 | Schreckenberg | 525/146 |
| 4,221,879 | 9/1980 | Humme | 525/66 |
| 4,226,950 | 10/1980 | Holub | 525/146 |

*Primary Examiner*—Paul Lieberman
*Attorney, Agent, or Firm*—Lawrence Rosen

[57] ABSTRACT

A thermoplastic resin composition excellent in solvent resistance, paintability and moldability which comprises a polycarbonate resin and a conjugated diene rubber copolymer comprising units of a conjugated diene rubber, an aromatic vinyl compound and at least one of vinyl cyanide compounds and optionally hydroxylated alkyl esters of unsaturated carboxylic acids in a weight proportion of 20:80 to 80:20 with a polyamide resin in an amount of 0.1 to 20 parts by weight on the basis of 100 parts by weight of the combined weight of the polycarbonate resin and the conjugated diene rubber copolymer.

3 Claims, 1 Drawing Figure

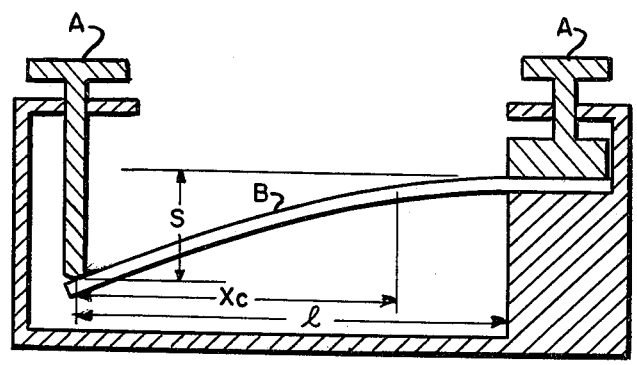

THERMOPLASTIC COMPOSITION CONTAINING POLYCARBONATE, POLYAMIDE AND RUBBERY GRAFT COPOLYMER

The present invention relates to a thermoplastic resin composition. More particularly, it relates to a thermoplastic resin composition excellent in solvent resistance, paintability and moldability.

It is known to improve the moldability of a polycarbonate resin while reducing the thickness dependency of the impact resistance by incorporating therein a diene rubber graft copolymer such as ABS resin, MBS resin and ABSM resin (Japanese Patent Publns. Nos. 15225/1963, 71/64 and 11496/67). It is also known to improve the impact resistance of a polycarbonate resin by incorporating therein ABS resin prepared by bulk-suspension polymerization (Japanese Patent Publn. No. 11142/76). However, these conventional compositions are insufficient in solvent resistance and paintability. Particularly, they tend to produce stress crack due to a stress on injection molding or a solvent on painting.

As the result of an extensive study, it has been found that the incorporation of certain specific resinous materials into a thermoplastic resin composition comprising a polycarbonate resin is quite effective in enhancing various physical properties such as solvent resistance, paintability and moldability.

According to this invention, there is provided a thermoplastic resin composition which comprises a polycarbonate resin and a conjugated diene rubber copolymer comprising units of a conjugated diene rubber, an aromatic vinyl compound and at least one of vinyl cyanide compounds and optionally hydroxylated alkyl esters of unsaturated carboxylic acids in a weight proportion of 20:80 to 80:20 with a polyamide resin in an amount of 0.1 to 20 parts by weight on the basis of 100 parts by weight of the combined weight of the polycarbonate resin and the conjugated diene rubber copolymer.

As the polycarbonate resin, there may be exemplified aromatic polycarbonates, aliphatic polycarbonates, aliphatic-aromatic polycarbonates, etc. In usual, polymers and copolymers of bisphenols such as bis(4-hydroxyphenyl)alkanes, bis(4-hydroxyphenyl)ethers, bis(4-hydroxyphenyl)sulfones, bis(4-hydroxyphenyl)sulfides and bis(4-hydroxyphenyl) sulfoxides and/or halogenated bisphenols are employed. Typical examples of the polycarbonate resin and their production are described in Encyclopedia of Polymer Science and Technology, Vol. 10, pages 710 to 764 (1969).

As the conjugated diene rubber copolymer, there may be exemplified a conjugated diene rubber/aromatic vinyl compound/vinyl cyanide compound copolymer, a conjugated diene rubber/aromatic vinyl compound-/optionally hydroxylated alkyl ester of unsaturated carboxylic acid copolymer, a conjugated diene rubber-/aromatic vinyl compound/vinyl cyanide compound-/optionally hydroxylated alkyl ester of unsaturated carboxylic acid copolymer, etc. Typical examples of the conjugated diene rubber copolymer and their production are described in "ABS Resin" issued by Society of Polymer Science, Japan (1970).

Examples of the conjugated diene rubber are polybutadiene, styrene/butadiene copolymer, acrylonitrile/-butadiene copolymer, etc. Examples of the aromatic vinyl compound are styrene, α-methylstyrene, dimethylstyrene, vinyltoluene, monochlorostyrene, etc. Examples of the vinyl cyanide compound are acrylonitrile, methacrylonitrile, etc. Examples of the optionally hydroxylated alkyl ester of unsaturated carboxylic acid are alkyl ester of acrylic acid (e.g. methyl acrylate, ethyl acrylate), alkyl ester of methacrylic acid (e.g. methyl methacrylate, ethyl methacrylate), hydroxyalkyl ester of acrylic acid (e.g. hydroxymethyl acrylate, hydroxyethyl acrylate), hydroxyalkyl ester of methacrylic acid (e.g. hydroxymethyl methacrylate, hydroxyethyl methacrylate), etc.

Examples of the polyamide resin are Nylon 4, Nylon 6, Nylon 7, Nylon 8, Nylon 9, Nylon 11, Nylon 12, Nylon 66, Nylon 610, etc. These polyamide resins may be used alone or in combination.

The weight proportion of the polycarbonate resin and the conjugated diene rubber copolymer may be from 20:80 to 80:20, preferably from 50:50 to 80:20. When the proportion of the polycarbonate resin is higher than the upper limit, the melt viscosity on molding is too high, and the moldability is inferior. Thus, the injection molded product from the resulting thermoplastic resin composition has a high residual stress, and the paintability and the solvent resistance are not improved even if blended with the polyamide resin. When the proportion of the polycarbonate resin is lower than the lower limit, the heat resistance is degraded. Further, the compatibility with the polyamide resin is lowered so that the impact strength is reduced.

The amount of the polyamide resin to be blended is from 0.1 to 20 parts by weight, preferably from 1 to 10 parts by weight, on the basis of 100 parts by weight of the combined amount of the polycarbonate resin and the conjugated diene rubber copolymer. When the amount is lower than 0.1 part by weight, the solvent resistance and the paintability are not improved. When the amount is higher than 20 parts by weight, the compatibility is lowered, and the impact strength is markedly reduced. In case of blending the polyamide resin in the said amount, the moldability is simultaneously improved.

Mixation of the polycarbonate resin, the conjugated diene rubber copolymer and the polyamide resin may be carried out by a conventional procedure, for instance, by the use of a roll, a Bumbury type mixer or an extruder. When desired, any conventional additive(s) such as a coloring agent, a dispersing agent, a lubricant or a filler may be incorporated therein.

Practical and presently preferred embodiment of this invention is illustratively shown in the following Examples and Comparative Examples, wherein part(s) and % are by weight unless otherwise indicated.

EXAMPLES 1 TO 4 AND COMPARATIVE EXAMPLES 1 TO 4

As the polycarbonate resin, "Panlite L-1250W" manufactured by Teijin Kasei K.K. was used. This particular polycarbonate resin has the structure

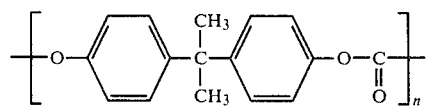

As the polyamide resin, "Unichika Nylon A-1030 BRL" (Nylon 6) manufactured by Unichika Ltd. or "Diamide L-1940" (Nylon 12) manufactured by Daicel Hills Inc. was used.

The conjugated diene rubber copolymer was prepared by the use of the following materials according to a conventional procedure:

| Conjugated diene | Part(s) |
| --- | --- |

The polycarbonate resin, the conjugated diene rubber copolymer and the polyamide resin were mixed together according to the prescription as shown in Table 1 by the use of a Henschel type mixer, and the mixture was pelletized by the aid of an extruder. The pellets were molded by the use of an injection molding machine to make a test piece and a flat plate (90×130×2 mm). Besides, the mixture was molded by the use of a press molding machine to make a flat plate (20×120×3 mm), which was used for determination of critical strain.

The solvent resistance was determined as follows:

A solvent system was applied onto the surface of a flat plate prepared by press molding, and the critical strain was measured by the use of a testing machine as shown in FIG. 1 of the accompanying drawing wherein A is a pressing metal and B is the test plate and calculated according to the following equation:

$$\text{Critical strain} = \frac{3H \times X_c \times \delta}{2L^3} \times 100 \, (\%) \quad (A)$$

wherein H is the thickness of the test plate (3 mm), $X_c$ is the distance between the point of maximum flexion and the point of crack, L is the distance between the fixed edge and the point of maximum flexion and δ is the amount of maximum flexion. The higher critical strain indicates a better solvent resistance.

The physical properties, solvent resistance (critical strain) and paintability (stress crack around the gate portion) were observed, and the results are shown in Table 1.

TABLE 1

| Composition | | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- | --- |
| Polycarbonate resin (part(s)) | | 60 | 50 | 70 | 50 | 85 | 10 | 55 | 40 |
| Conjugated diene rubber copolymer (part(s)) | | | | | | | | | |
| A | | 40 | 50 | — | — | 15 | 90 | 45 | 60 |
| B | | — | — | 30 | 50 | — | — | — | — |
| Total (part(s)) | | 100 | 100 | 100 | 100 | 100 | 100 | 100 | 100 |
| Polyamide resin (part(s)) | | | | | | | | | |
| Nylon 6 | | 2.0 | — | 1.5 | — | 3.0 | 2.0 | — | 25.0 |
| Nylon 12 | | — | 8.5 | — | 5.0 | — | — | — | — |
| Impact strength (¼", Izod, notched) | ASTM-D-256 (kg·cm/cm²) | 25.0 | 31.0 | 23.0 | 32.0 | 6.0 | 10.0 | 35.0 | 5.9 |
| Heat distortion temperature (264 psi, without annealing) | ASTM-D-648 (°C.) | 123 | 118 | 130 | 117 | 129 | 105 | 120 | 120 |
| Processability (230° C., 60 kg/cm²) | Koka-type flow tester (ml/min) | 0.30 | 0.35 | 0.25 | 0.35 | 0.05 | 0.50 | 0.18 | 0.30 |
| Solvent resistance (%) | | | | | | | | | |
| Toluene/cyclohexane = 3/7 | | 0.55 | 0.66 | 0.55 | 0.60 | 0.40 | 0.55 | 0.20 | 0.58 |
| Thinner for acrylic paint | | 0.70 | 0.80 | 0.70 | 0.75 | 0.50 | 0.60 | 0.30 | 0.60 |
| Paintability (stress cracking) | | None | None | None | None | Observed | None | Observed | None |

| rubber copolymer | A | B |
| --- | --- | --- |
| Styrene/butadiene copolymer dispersion (solids) | 30 | 50 |
| Styrene | 45 | 30 |
| Acrylonitrile | 25 | 20 |
| Potassium peroxide | 0.5 | 0.5 |
| Potassium oleate | 0.5 | 0.5 |
| Dodecylmercaptan | 0.4 | 0.4 |
| Styrene | — | 70 |
| Acrylonitrile | — | 30 |
| Potassium persulfate | — | 0.5 |
| Sodium laurylbenzenesulfonate | — | 2 |
| Styrene/butadiene copolymer content (%) | 30 | 20 |

EXAMPLES 5 TO 8 AND COMPARATIVE EXAMPLE 5

As the polycarbonate resin, "Panlite L-1250W" manufactured by Teijin Kasei K.K. was used. As the polyamide resin, "Unichika Nylon A-1030 BRL" (Nylon 6) manufactured by Unichika Ltd. or "Diamide L-1940" (Nylon 12) manufactured by Daicel Hills Inc. was used.

The conjugated diene rubber copolymer was prepared by the use of the following materials according to a conventional procedure:

| Conjugated diene rubber copolymer | C | D | E | F* |
| --- | --- | --- | --- | --- |
| Styrene/butadiene copolymer dispersion (solids) | 45 | 45 | 45 | 45 |
| Styrene | 25 | 25 | 25 | (25) |
| Methyl methacrylate | 30 | 25 | 25 | 25 |
| Methyl acrylate | — | 5 | — | — |
| Butyl acrylate | — | — | 5 | — |
| Hydroxyethyl acrylate | — | — | — | 5 |
| Dextrin | 0.5 | 0.5 | 0.5 | 0.5(0.4) |
| Sodium pyrophosphate | 0.15 | 0.15 | 0.15 | 0.15(0.15) |
| Ferrous sulfate | 0.01 | 0.01 | 0.01 | 0.01(0.01) |
| Sodium dodecylbenzenesulfonate | — | — | — | 1.5 |
| Sodium hydroxide | — | — | — | 0.4 |
| Styrene/butadiene copolymer content (%) | 45 | 45 | 45 | 45 |

Note:
*Two-stage polymerization. The amount in the parenthesis indicates the use for the second polymerization.

The polycarbonate resin, the conjugated diene rubber copolymer and the polyamide resin were mixed together according to the prescription as shown in Table 2 by the use of a Henschel type mixer, and the mixture was pelletized by the aid of an extruder. The pellets were molded by the use of an injection molding machine to make a test piece and a flat plate (90×130×2 mm). Besides, the mixture was molded by the use of a press molding machine to make a flat plate (20×120×3 mm), which was used for determination of critical strain.

The solvent resistance was determined as follows:

A solvent system was applied onto the surface of a flat plate prepared by press molding, and the critical strain was measured by the use of a test machine as shown in FIG. 1 and calculated according to the said equation (A).

The physical properties, solvent resistance (critical strain) and paintability (stress crack around the gate portion) were observed, and the results are shown in Table 2.

| Conjugated diene | Part(s) | | |
|---|---|---|---|
| rubber copolymer | G | H | I |
| Butyl acrylate | — | 5 | — |
| Hydroxyethyl acrylate | — | — | 3 |
| Dextrin | 0.9 | 0.9 | 0.9 |
| Sodium pyrophosphate | 0.3 | 0.3 | 0.3 |
| Ferrous sulfate | 0.02 | 0.02 | 0.02 |
| Cumene hydroperoxide | 0.1 | 0.1 | 0.1 |
| Sodium dodecylbenzene-sulfonate | 1.5 | 1.3 | 1.5 |
| Styrene/butadiene copolymer content (%) | 25 | 25 | 25 |

TABLE 2

| Composition | | Example | | | | Comparative Example |
|---|---|---|---|---|---|---|
| | | 5 | 6 | 7 | 8 | 5 |
| Polycarbonate resin (part(s)) | | 70 | 65 | 60 | 70 | 85 |
| Conjugated diene rubber copolymer (part(s)) | | | | | | |
| C | | 30 | — | — | — | 15 |
| D | | — | 35 | — | — | — |
| E | | — | — | 40 | — | — |
| F | | — | — | — | 30 | — |
| Total (part(s)) | | 100 | 100 | 100 | 100 | 100 |
| Polyamide resin (part(s)) | | | | | | |
| Nylon 6 | | 3.0 | 1.0 | — | 3.0 | 2.0 |
| Nylon 12 | | — | — | 17.0 | — | — |
| Impact strength (1/4", Izod, notched) | ASTM-D-256 (kg · cm/cm$^2$) | 29.5 | 32.5 | 30.0 | 27.5 | 5.5 |
| Heat distortion temperature (264 psi, without annealing) | ASTM-D-648 (°C.) | 125 | 120 | 118 | 120 | 128 |
| Processability (230° C., 60 kg/cm$^2$) | Koka-type flow tester (ml/min) | 0.38 | 0.38 | 0.40 | 0.41 | 0.09 |
| Solvent resistance (%) | | | | | | |
| Toluene/cyclohexane = 3/7 | | 0.50 | 0.50 | 0.80 | 0.60 | 0.45 |
| Thinner for acrylic paint | | 0.70 | 0.65 | 0.85 | 0.65 | 0.50 |
| Paintability (stress cracking) | | None | None | None | None | Observed |

EXAMPLES 9 TO 11 AND COMPARATIVE EXAMPLES 6 AND 7

As the polycarbonate resin, "Panlite L-1250W" manufactured by Teijin Kasei K.K. was used. As the polyamide resin, "Unichika Nylon A-1030 BRL" (Nylon 6) manufactured by Unichika Ltd. or "Diamide L-1940" (Nylon 12) manufactured by Daicel Hills Inc. was used.

The conjugated diene rubber copolymer was prepared by the use of the following materials according to a conventional procedure:

| Conjugated diene | Part(s) | | |
|---|---|---|---|
| rubber copolymer | G | H | I |
| Styrene/butadiene copolymer dispersion (solids) | 25 | 25 | 25 |
| Styrene | 30 | 30 | 30 |
| Acrylonitrile | 20 | 20 | 20 |
| Methyl methacrylate | 20 | 20 | 18 |
| Ethyl acrylate | 5 | — | 4 |

The polycarbonate resin, the conjugated diene rubber copolymer and the polyamide resin were mixed together according to the prescription as shown in Table 3 by the use of a Henschel type mixer, and the mixture was pelletized by the aid of an extruder. The pellets were molded by the use of an injection molding machine to make a test piece and a flat plate (90×130×2 mm). Besides, the mixture was molded by the use of a press molding machine to make a flat plate (20×120×3 mm), which was used for determination of critical strain.

The solvent resistance was determined as follows:

A solvent system was applied onto the surface of a flat plate prepared by press molding, and the critical strain was measured by the use of a testing machine as shown in FIG. 1 and calculated according to the said equation (A).

The physical properties, solvent resistance (critical strain) and paintability (stress crack around the gate portion) were observed, and the results are shown in Table 3.

TABLE 3

| Compositon | Example | | | Comparative Example | |
|---|---|---|---|---|---|
| | 9 | 10 | 11 | 6 | 7 |
| Polycarbonate resin (part(s)) | 50 | 50 | 40 | 55 | 55 |
| Conjugated diene rubber copolymer (part(s)) | | | | | |
| G | 50 | — | — | 45 | — |
| H | — | 50 | — | — | 45 |
| I | — | — | 60 | — | — |
| Total (part(s)) | 100 | 100 | 100 | 100 | 100 |

TABLE 3-continued

| Compositon | | Example | | | Comparative Example | |
|---|---|---|---|---|---|---|
| | | 9 | 10 | 11 | 6 | 7 |
| Polyamide resin (part(s)) | | | | | | |
| Nylon 6 | | — | 10.0 | 6.0 | — | — |
| Nylon 12 | | 8.0 | — | — | — | 25.0 |
| Impact strength (¼", Izod, notched) | ASTM-D-256 (kg . cm/cm²) | 30.0 | 20.0 | 25.5 | 36.5 | 5.7 |
| Heat distortion temperature (264 psi, without annealing) | ASTM-D-648 (°C.) | 115 | 115 | 113 | 120 | 119 |
| Processability (230°C., 60 kg/cm²) | Koka-type flow-tester (ml/min) | 0.40 | 0.40 | 0.42 | 0.18 | 0.35 |
| Solvent resistance (%) | | | | | | |
| Toluene/cyclohexane = 3/7 | | 0.70 | 0.70 | 0.65 | 0.20 | 0.60 |
| Thinner for acrylic paint | | 0.80 | 0.75 | 0.70 | 0.31 | 0.65 |
| Paintability (stress cracking) | | None | None | None | Observed | None |

What is claimed is:

1. A thermoplastic resin composition which comprises a polycarbonate resin and a conjugated diene rubber copolymer, said conjugated diene rubber being prepared by polymerizing an aromatic vinyl compound and at least one of vinyl cyanide compounds and hydroxylated or nonhydroxylated alkyl esters of unsaturated monocarboxylic acids onto a conjugated diene rubber, in a weight propoprtion of 20:80 to 80:20 with a polyamide resin in an amount of 0.1 to 20 parts by weight on the basis of 100 parts by weight of the combined weight of the polycarbonate resin and the conjugated diene rubber copolymer.

2. The thermoplastic resin composition according to claim 1, wherein the weight proportion of the polycarbonate resin and the conjugated diene rubber copolymer is from 50:50 to 80:20.

3. The thermoplastic resin composition according to claim 1, wherein the amount of the polyamide resin is 1 to 10 parts by weight on the basis of 100 parts by weight of the combined weight of the polycarbonate resin and the conjugated diene rubber copolymer.

* * * * *